United States Patent [19]

Forrest

[11] 4,218,990
[45] Aug. 26, 1980

[54] ANIMAL PROD SYSTEM

[76] Inventor: William J. Forrest, 3400 NW. Expressway, Oklahoma City, Okla. 73112

[21] Appl. No.: 967,861

[22] Filed: Dec. 8, 1978

[51] Int. Cl.³ .............................................. A01K 29/00
[52] U.S. Cl. ..................................... 119/96; 119/151; 231/2 R
[58] Field of Search ..................... 119/27, 29, 96, 151; 231/2 R

[56] References Cited

U.S. PATENT DOCUMENTS

| | | | |
|---|---|---|---|
| 677,297 | 6/1901 | Watson | 119/151 |
| 1,481,174 | 1/1924 | Zimmerman | 119/27 |
| 2,103,401 | 12/1937 | Bailey | 231/2 R |
| 2,779,309 | 1/1957 | Myer et al. | 119/27 |
| 3,762,631 | 10/1973 | Jurkoic | 231/2 R |

Primary Examiner—Louis G. Mancene
Assistant Examiner—Robert P. Swiatek
Attorney, Agent, or Firm—Dunlap, Codding & McCarthy

[57] ABSTRACT

An improved animal prod having a base shaped to engage a portion of the animal's hindquarter and a thigh engaging assembly shaped and positioned to engage a portion of at least one of the animal's hind legs generally near the animal's inside thigh and generally near the animal's hindquarter in an operating position of the animal prod with the base engaging the animal's hindquarter.

7 Claims, 3 Drawing Figures

ANIMAL PROD SYSTEM

BACKGROUND OF THE INVENTION

1. Field of the Invention

The present invention relates generally to an improved animal prod system and, more particularly, but not by way of limitation, to an improved animal prod having portions shaped for engaging the animal's hindquarter and the animal's inside thigh generally near the animal's hindquarter.

DESCRIPTION OF THE PREFERRED EBODIMENT

Figure 1:
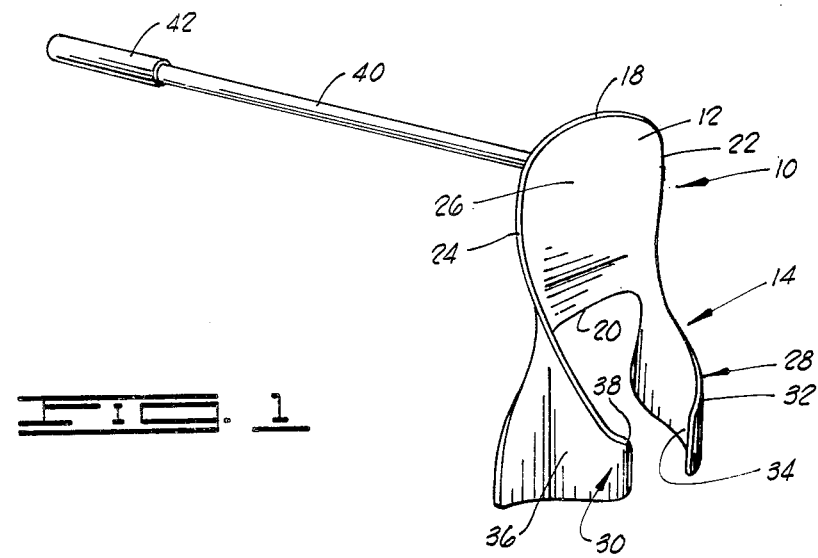
FIG. 1 is a perspective view of an animal prod constructed in accordance with the present invention.
Figure 2:
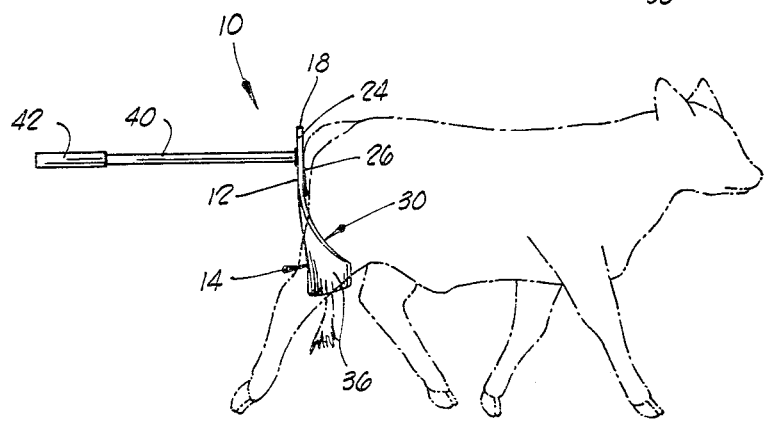
FIG. 2 is a view showing the animal prod of FIG. 1 engaging an animal, the animal being partially shown in FIG. 2 in dashed lines.

Referring to the drawings in general and to FIGS. 1 and 2 in particular, shown therein and designated via the reference numeral 10 is an animal prod constructed in accordance with the present invention. In general, the animal prod 10 includes a base 12, a thigh engaging assembly 14 and a handle 40 for supporting or holding and positioning the base 12 and the thigh engaging assembly 14 during the operation of the animal prod 10. In one preferred form, the base 12 and the thigh engaging assembly 14 are integrally constructed and formed from a single piece of material, as shown in the drawings.

The base 12 has an upper end 18, a lower end 20, a first side 22 and a second side 24. The base 12 also has an animal engaging surface 26 which is shaped to fit against and engage a portion of the animal's hindquarer, generally near the animal's hind legs in an operating position of the animal prod 10.

The thigh engaging assembly 14 is connected to the base 12 and extends a distance from the base 12. A portion of the thigh engaging assembly 14 is shaped and positioned with respect to the base 12 to engage a portion of at least one of the animal's hind legs generally near the animal's inside thigh and generally near the animal's hindquarter in an operating position of the animal prod 10 with the base 12 engaging a portion of the animal's hindquarter. More particularly, the thigh engaging assembly 14 includes a left thigh engaging extension 28 and a right thigh engaging extension 30.

The left thigh engaging extension 28 is connected to the base 12 generally near the first side 22 and generally near the lower end 20 of the base 12. The left thigh engaging extension 28 extends a distance angularly from the base 12 and, more particularly, the left thigh engaging extension 28 extends about perpendicularly from the animal engaging surface 26 of the base 12. The left thigh engaging extension 28 has an animal engaging surface 32 which is shaped and positioned with respect to the base 12 to fit against and engage a portion of the inside left thigh of the animal's left rear leg in an operating position of the animal prod 10 with the base 12 moved against and engaging the animal's hindquarter. A portion 34 of the end of the left thigh engaging extension 28, generally opposite the end which is connected to the base 12, is curved and extends a distance in a direction generally toward the right thigh engaging extension 30 to facilitate the insertion of the thigh engaging assembly 14 between the animal's rear legs as the animal prod 10 is moved into the operating position, the curved portion 34 thereby facilitating the positioning of the animal prod 10 in an operating position.

The right thigh engaging extension 30 is connected to the base 12 generally near the second side 24 and generally near the lower end 20 of the base 12. The right thigh engaging extension 30 extends a distance angularly from the base 12 and, more particularly, the right thigh engaging extension 30 extends about perpendicularly from the animal engaging surface 26 of the base 12.

The right thigh engaging extension 30 has an animal engaging surface 36 which is shaped and positioned with respect to the base 12 to be moved against and engage a portion of the inside right thigh of the animal's right rear leg in an operating position of the animal prod 10 with the base 12 moved against and engaging the animal's hindquarter. A portion 38 of the end of the right thigh engaging extension 30, generally opposite the end which is connected to the base 12, is curved and extends a distance in a direction generally toward the left thigh engaging extension 28 to facilitate the insertion of the thigh engaging assembly 14 between the animal's rear legs as the animal prod 10 is moved into the operating position, the curved portion 38 thereby facilitating the positioning of the animal prod 10 in an operating position.

One end of the handle 40 is connected to one surface of the base 12, generally opposite the animal engaging surface 26. The handle 40 extends a distance from the base 12 and the end of the handle 40, opposite the end connected to the base 12 includes a gripping surface 42 which is shaped to be gripped via an individual during the operation of the animal prod 10.

In many instances, it is desirable to move animals such as cattle, for example, from one place to another such as the moving of cattle from a pen into a holding chute or a working chute, for example. In the past, this moving process has been accomplished by pulling the animal via a rope secured about the animal's head or by prodding the animal with an electric prod device which imparts or impresses a sudden electrical shock when pressed against the animal. The moving of animals in this manner results in an emotional trauma experienced by the animal. This emotional trauma has resulted in a relatively large death loss in loading animals onto a train for transporting them to a stockyard or other such remote location and, among the surviving animals, this emotional trauma can result in a relatively large body weight loss, a body weight loss which requires a considerable amount of time in a feedlot to recoup in most instances and a body weight loss which in many instances may not be recoupable.

The cattle prod 10 of the present invention provides a means for moving animals while substantially eliminating or, at least, substantially reducing the emotional trauma effect generally referred to before. During the operation, an individual grips the handle 40 via the gripping surface 42 and positions the animal prod 10 against the hindquarter of the animal, as shown in FIG. 2. In an operative position of the animal prod 10 against the animal, the animal engaging surface 26 of the base 12 is moved against and engages the animal's hindquarter generally near the animal's rear legs and, in this position of the base 12, the animal engaging surface 32 of the left thigh engaging extension 28 is moved against and engages a portion of the animal's inside left thigh generally near the animal's hindquarter and the animal engaging surface 36 of the right thigh engaging extension 30 is positioned against and engages a portion of the inside right thigh generally near the animal's hindquarter. In this position of the animal prod 10, the individual moves the animal forward simply by pushing on the handle, thereby applying a pressure via the animal engaging surfaces 26, 32 and 36 against the engaged portions of the animal's body, the pressure being applied in a general direction in which the animal is to be moved.

Figure 3:
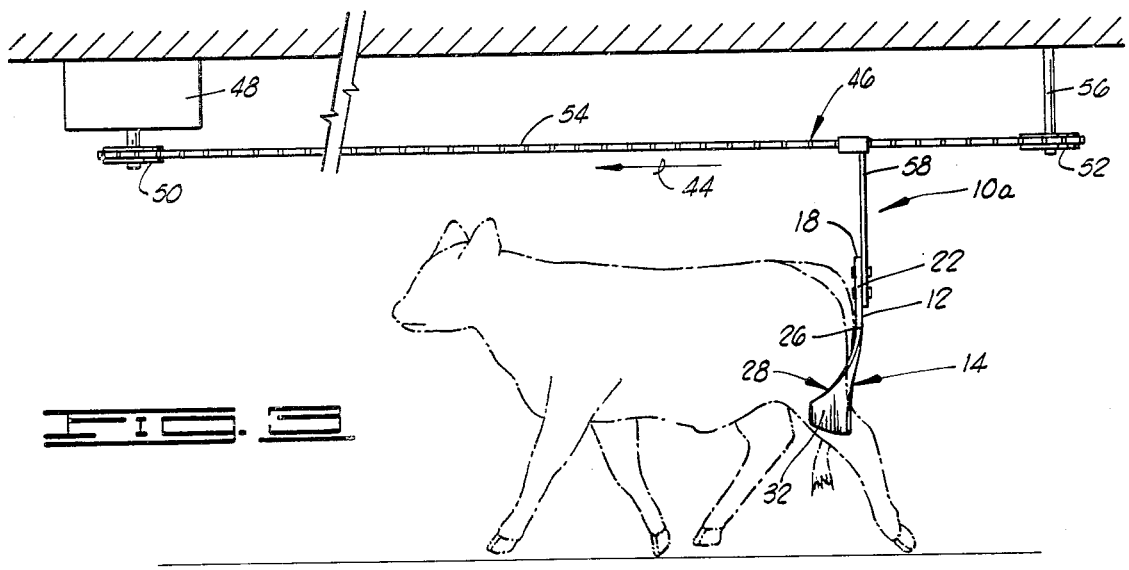
FIG. 3 is a modified animal prod constructed in accordance with the present invention and mounted to be automatically moved against an animal.

Shown in FIG. 3 is a modified embodiment of an animal prod 10a constructed in accordance with the present invention. The animal prod 10a is constructed exactly like the animal prod 10 described in detail before, except the animal prod 10a does not include a handle and the animal prod 10a is connected to a cattle prod moving apparatus 46 for automatically moving the animal prod 10a in a direction 44.

The cattle prod moving apparatus 46 includes an electric motor 48 having a first gear 50 connected to the output shaft thereof, a second gear 52 and a chain 54. The motor 48 is constructed to be mounted to a ceiling or from a ceiling structure, as generally shown in the drawing. The second gear 52 is rotatingly or journally connected to one end of a support rod 56 and the opposite end of the support rod 56 is secured to the ceiling structure, the second gear 52 being spaced a distance from the first gear 50. The chain 54 is operatively connected to the first and the second gears 50 and 52 such that when the motor 48 is activated, the motor 48 drivingly rotates the first gear 50 thereby drivingly moving one portion of the chain 54 in the direction 44.

One end of a prod support 58 is secured to the chain 54 and the opposite end of the prod support 58 is secured to the base 12 of the animal prod 10a.

Thus, when the motor 48 is activated to drivingly rotate the first gear 50, the chain 54 is driven in the direction 44 thereby drivingly moving the animal prod 10a in the direction 44 via the interconnection between the animal prod 10a and the chain 54 provided by the prod support 58.

Changes may be made in the construction and the operation of the various parts, elements and assemblies disclosed herein and changes may be made in steps of the animal moving method disclosed herein without departing from the spirit and the scope of the invention as defined via the following claims.

What is claimed is:

1. An animal prod, comprising:
    a base having an upper end, a lower end, a first side and a second side and being shaped to engage a portion of an animal's hindquarter in an operating position of the animal prod;
    a left thigh engaging extension connected to the base generally near the first side and generally near the lower end of the base and extending a distance from the base, a portion of the left thigh engaging extension being shaped to engage a portion of the animal's left hind leg generally near the animal's inside thigh and generally near the animal's hindquarter in an operating position of the animal prod with the base engaging a portion of the animal's hindquarter;
    a right thigh engaging extension connected to the base generally near the second side and generally near the lower end of the base and extending a distance from the base, a portion of the right thigh engaging extension being shaped to engage a portion of the animal's right hind leg generally near the animal's inside thigh and generally near the animal's hindquarter in an operating position of the animal prod with the base engaging a portion of the animal's hindquarter; and
    means for holdingly supporting the base and the left and the right thigh engaging extensions connected thereto.

2. The animal prod of claim 1 wherein the base includes an animal engaging surface comprising the portion of the base shaped to engage the animal; and wherein the left thigh engaging extension includes an animal engaging surface comprising the portion of the left thigh engaging extension shaped to engage the animal; and wherein the right thigh engaging extension includes an animal engaging surface comprising the portion of the right thigh extension shaped to engage the animal.

3. The animal prod of claim 2 wherein the left thigh engaging extension is defined further as extending about perpendicularly from the animal engaging surface of the base; and wherein the right thigh engaging extension is defined further as extending about perpendicularly from the animal engaging surface of the base.

4. The animal prod of claim 3 wherein a portion of the end of the left thigh engaging extension, generally opposite the end connected to the base, is curved and extends a distance in a direction generally toward the right thigh engaging extension, and wherein a portion of the end of the right thigh engaging extension, generally opposite the end connected to the base, is curved and extends in a direction generally toward the left thigh engaging extension for facilitating the positioning of the animal prod in an operating position.

5. The animal prod of claim 1 wherein the means for holdingly supporting the base and the thigh engaging assembly is defined further to include:
    a handle having one end connected to and extending a distance from a surface of the base, generally opposite the animal engaging surface, a gripping surface being formed on an end portion of the handle, generally opposite the end of the handle connected to the base.

6. The animal prod of claim 1 wherein the means for holdingly supporting the base and the thigh engaging assembly is defined further to include:
    chain means;
    means for supporting the chain means;
    means for drivingly moving the chain means; and
    a prod support connected to the chain means and connected to the base, the base and the thigh engaging assembly being moved as the chain means is drivingly moved.

7. A method for moving animals using an animal prod comprising the steps of:
    engaging a portion of the animal's hindquarter with the prod;
    engaging a portion of the animal's left hind leg with the prod generally near the inside thigh and generally near the animal's hindquarter about simultaneously with the engaging of the animal's hindquarter;
    engaging a portion of the animal's right hind leg with the prod generally near the animal's inside thigh and generally near the animal's hindquarter about simultaneously with the engaging of the animal's hindquarter; and
    applying a pressure with the prod against the engaged portions of the animal in a general direction in which the animal is to be moved.

* * * * *